Nov. 25, 1952 H. C. A. VAN DUUREN 2,619,541

SYSTEM FOR RECEIVING MESSAGES TRANSMITTED ELECTRICALLY

Filed July 25, 1946

INVENTOR.

Hendrik C. A. van Duuren,

BY Brown, Jackson, Boettcher & Dienner

Attys.

Patented Nov. 25, 1952

2,619,541

UNITED STATES PATENT OFFICE 2,619,541

SYSTEM FOR RECEIVING MESSAGES TRANSMITTED ELECTRICALLY

Hendrik C. A. van Duuren, Wassenaar, Netherlands, assignor to Staatsbedrijf der Posterijen, Telegrafie en Telefonie, The Hague, Netherlands Application July 25, 1946, Serial No. 686,181
In the Netherlands June 29, 1944

Section 1, Public Law 690, August 8, 1946
Patent expires June 29, 1964

11 Claims. (Cl. 178—66)

Figure 1:
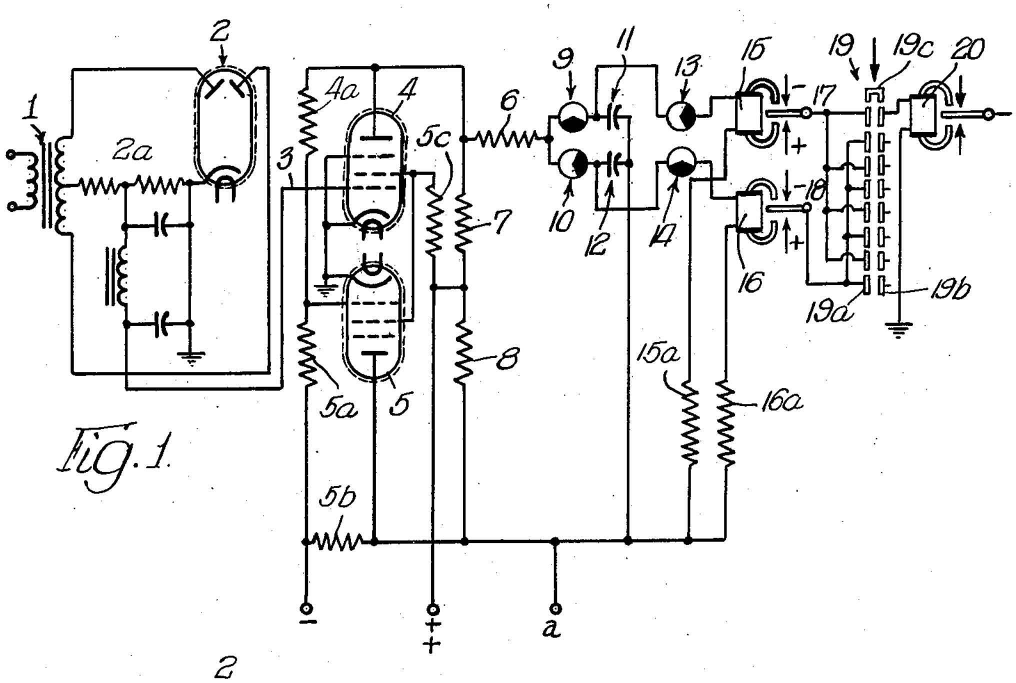

The present invention refers to a device for receiving telegraphic messages transmitted by wire or by radio. The device is intended to suppress disturbances on the radio path as much as possible.

The invention is particularly applicable to telegraph receiving apparatus for receiving signals consisting of elements, which apparatus registers these elements successively on several units which, for that purpose, cooperate consecutively with a common receiving device on which the received currents arrive.

In a receiver containing a distributor, for instance, the common unit is the input relay and the units for collecting the elements are the receiving relays which consecutively are connected by means of a distributor to the armature of the input relay, if this is a mechanical relay.

In an apparatus containing an electrical input relay, an analogous circuit arrangement is used. With regard to such an apparatus, the expression "scanning of the signalling current" is used.

The invention is based on the idea that a minimum sensitivity to disturbances is obtained by means of a quite new method of scanning, which will hereafter be called "integrating scanning." According to the invention, the disposition of the receiving unit depends on the integral over the time required for scanning the condition of the input unit (integrating scanning). In the usual way of scanning, the position of the receiver relay depends on the current that passes through a relay during a short interval of time. Close upon this interval is the end of the scanning time.

The current passing through the relay during this interval is directly proportional to the amplitude of the incoming signal. When a limiter, key or mechanical relay is placed before the receiver relay, its position depends on the polarity only.

The integrating scanning has in common with the system described above that the position of the relay depends on the current or the voltage during a short interval of time at the end of the scanning.

In the present system, however, this current or voltage is not proportional to the amplitude of the incoming signal, but to the value of current or voltage integrated over the scanning time.

It is useful to choose the scanning-time equal to the length of the signal. There are two ways for effecting integrating operation, viz., by means of a large self-inductance in the circuit of the relay, or by means of a condenser which is charged by way of a high resistance.

The former system cannot be used together with a mechanical input relay. The latter system may be used together with a mechanical relay as well as with an electric relay.

For integrating scanning, an electric input relay is better than a mechanical input relay, and for that reason the former is preferred.

As far as integrating scanning with an electric input relay is concerned, the invention will be explained with reference to the accompanying drawing which shows merely by way of example, a circuit arrangement and an alternative for this scanning method.

Figure 2:
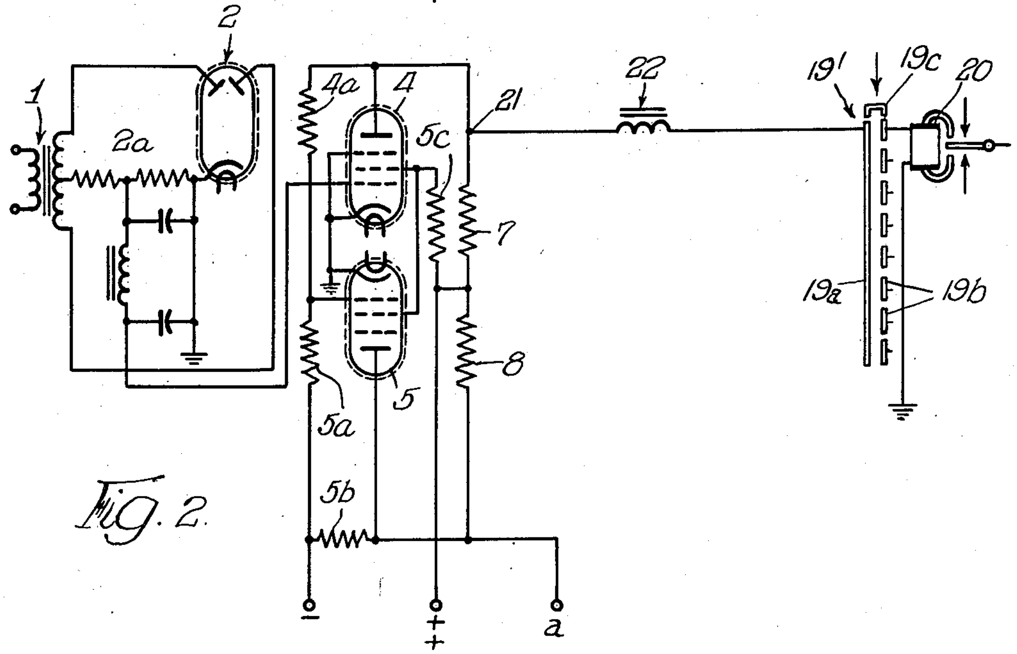

In this drawing:

Figure 1 is a circuit diagram of one embodiment of the invention employing condensers for effecting the integrating scanning, and Figure 2 is a circuit diagram of the alternative embodiment employing a large self-inductance in the circuit for effecting the integrating scanning.

Referring first to Figure 1, the signals come in on the left hand side of the figure in the shape of carrier oscillations, which are applied through transformer 1 to rectifier 2.

The signals are formed by the selective presence and absence of carrier oscillations on transformer 1. Rectifier 2 is rendered selectively conductive and non-conductive in response respectively to the presence and absence of signals on the incoming side. The rectifier tube 2 in its alternative conditions effects the application of a voltage signal or no voltage signal over signal shaping network 2a to the conductor 3 and the valve combination 4—5. This combination converts the intermittent currents on conductor 3 to positive and negative current impulses in circuits 6, 7, 8, 9, 10, 11 and 12, because the valves let pass current by turns, and when a current passes through one valve, no current can pass through the other valve. Contacts 9, 10, 13 and 14 are opened and closed periodically by the main distributor of the apparatus; condensers 11 and 12 are charged by turns through contacts 9 and 10 in that part of the circuit which also comprises the resistors 6, 7 and 8.

The functioning of contacts 9, 10, 13 and 14 is such that contact 13 is always opened when contact 9 is closed, and contact 14 is opened when contact 10 is closed, and conversely.

Consequently, condensers 11 and 12 are alternately charged over resistor 6 and discharged over resistors 15a, 16a and relays 15 and 16 respectively.

Contacts 9, 10, 13 and 14 operate in the rhythm of the incoming signal elements, and consequently relays 15 and 16 transmit in the same rhythm and by means of their contacts 17 and 18 respectively, voltages corresponding to the signal elements received, such transmitted voltages being applied to the main distributor 19 to which the receiver relays 20 (one of which is shown in the drawing) are connected. This rotary distributor 19 is schematically shown as comprising input commutator segments 19*a* connected alternately with the polarized relays 15 and 16, and output commutator segments 19*b* connected with the successive receiver relays 20, these pairs of cooperating segments being successively bridged by the revolving wiping brush 19*c*.

The time-constant of the circuits 6, 7, 8, 11 or 12 is such that during a signal element the charging of the condenser is still almost linear, so that, when that period has passed, the charge of the condenser represents the integrated value of the current in circuits 6, 7 and 8. Furthermore, the device is dimensioned in such a way that, when during all time the same polarity has existed in the said circuit, the charge is a large multiple of the minimum charge required for exciting relay 15 or relay 16.

The voltage on each condenser 11, 12 at the end of scanning is a measure of the voltage integrated over the complete signal element length, each condenser thus functioning as a registering unit and controlling by itself the working of the relay connected to the condenser.

Thus, the voltage taken from the scanning device is isolated from the signal at the moment that it has to work, which condition is to be considered as a feature of the circuit arrangement according to the invention.

I shall now briefly describe the operation of the system in its entirety. The transformer 1 responds firstly to the presence or absence of signal voltage impressed on its primary. The absence of signal voltage leaves the control grid of the upper tube 4 at ground potential (the control grids of both tubes 4 and 5 being those closest to the heated cathodes). The screen grids of both tubes are positively biased over resistance 5*c*, the control grid and the plate of tube 5 being connected to negative potential respectively over resistances 5*a* and 5*b*. Resistance 4*a* is connected between the plate of tube 4 and the control grid of tube 5. When the control grid of upper tube 4 is thus at ground potential, the tube 4 is conductive and accordingly it biases the control grid of the lower tube 5 negatively over resistor 4*a*, thus cutting off this lower tube. On the other hand, when signal voltage is impressed on the transformer 1, the voltages induced in the secondary are rectified in the full-wave rectifier 2 to bring about a suitable voltage drop which biases the upper tube 4 negatively. This negative bias on the upper tube raises to a more positive voltage the plate of upper tube 4, thereby bringing to a more positive value the control grid of lower tube 5 to overcome the negative bias thereon and render same conductive. It will be seen from the foregoing that in the absence of signal voltage on the primary of transformer 1, the upper tube 4 becomes conductive and the lower tube 5 cuts off; and conversely, in the presence of signal voltage on the transformer 1 the reverse takes place, because the lower tube 5 then becomes conductive and the upper tube 4 cuts off. In consequence, the far terminal of resistance 7 is made to fall below that of supply terminal ±, and likewise, but in phase opposition, this also happens to the far terminal of resistance 8.

Referring now to the circuit comprising the three resistors 6, 7 and 8, the distributor contacts 9 and 10, and the condensers 11 and 12, it will be seen from the foregoing that when a signal voltage is impressed on the transformer 1, a voltage is caused to flow in said circuit 6—12 in a clockwise direction; and, conversely, when no signal voltage is impressed on transformer 1, a voltage is caused to flow through said circuit 6—12 in the opposite or counterclockwise direction.

As will be seen from the foregoing, one of the particular advantages of the above described integrating arrangement is the ability to deal or cope with the occurrence of short intervals of opposite or erroneous polarity during the short interval of integration, without causing erroneous operation of the receiving apparatus. In prior systems, these short intervals of opposite polarity are likely to give rise to wrong registration of the pick-off; for example, if the closure of contacts 9, 10 should coincide for an instant with an accidental polarity inversion. In my improved system, the charges on the condensers 11 and 12 may vary through a relatively wide range before the correct operation of the polarized relays 15 and 16 is likely to be disturbed or endangered.

As stated in the fore part of this specification, the integration may also be effected (other than by the above-described condenser and resistor embodiment) by means of an inductance element. Such alternative or modified arrangement is illustrated in Figure 2 wherein this inductance element is indicated at 22. This inductance element may be inserted for the performance of this integrating function between point 21 and the main distributor leading to the receiver relays 20. In this embodiment, the rotary distributor, herein designated 19′, comprises an input commutator bar 19*a* connected with the inductance element 22, and output commutator segments 19*b* connected with the successive receiver relays 20, such commutator bar being successively connected with the commutator segments by the revolving wiping brush 19*c*.

While I have illustrated and described what I regard to be the preferred embodiments of my invention, nevertheless it will be understood that such are merely exemplary and that numerous modifications and rearrangements may be made therein without departing from the essence of the invention.

I claim:

1. In receiving apparatus for telegraph systems, the combination of an electrical input relay adapted to receive the incoming signals, said input relay comprising a plurality of thermionic tubes, signal storing means adapted to receive and store signals from said input relay, said signal storing means comprising a plurality of condensers, said thermionic tubes responding to the elements of the signals and converting them into positive or negative charges for charging said condensers, relays responding to the charges in said condensers, and distributor means receiving the signal elements from said latter relays.

2. In receiving apparatus for a telegraph system, the combination of an input relay comprising electron tube means, a plurality of condensers adapted to receive and store signals from said input relay, charging contacts for controlling the connection of said condensers with said input relay, polarized relays to which said condensers are adapted to discharge, discharging contacts for controlling the connection of said condensers with said polarized relays, and distributor means operative to actuate said charging and discharging contacts in predetermined sequence.

3. In receiving apparatus for a synchronous telegraph system, the combination of an electrical input relay adapted to receive the incoming signals, said input relay comprising a plurality of thermionic tubes, signal storing means adapted to receive and store signals from said input relay, said signal storing means comprising a plurality of condensers, charging contacts for controlling the connections from said thermionic tube to said condensers, said thermionic tubes being operative to sequentially charge said condensers with different polarity charges depending upon whether the signal element then being received is a marking element or a spacing element, polarized relays adapted to be energized selectively by discharges from said condensers, discharging contacts for controlling the connections from said condensers to said polarized relays, distributor means receiving signal elements from said polarized relays, and output relays receiving signal elements from said distributor means, said charging and discharging contacts being operated synchronously with said distributor means.

4. In a receiver for the registration in a plurality of receiving units of an equal number of elements of a signal transmitted on a synchronous telegraph system, the combination of an input relay, a plurality of registering units, a plurality of receiving units, and distribution contacts which for practically the full duration of the signal element form circuits between the input relay and said registering units intermittently, the current in said circuits flowing in a direction that depends upon the received signal, each receiving unit being so constructed that it can be brought into the correct condition even as a result of a charge in the registering unit amounting to only a small fraction of the charge that can be obtained under optimum conditions.

5. In telegraph receiving apparatus for receiving code combination signals each composed of marking and spacing elements, the combination of electrical input relay means receiving the signal elements, condenser means adapted to be selectively charged from said electrical input relay means in response to the marking and spacing elements of each signal, said electrical input relay means comprising electron tube means controlling the charging of said condensers and cooperating therewith to effect integrating scanning of the signal elements, and output relay means receiving the integrated signal elements from said condenser means.

6. In telegraph receiving apparatus for receiving code combination signals each composed of marking and spacing elements, the combination of an electrical input relay receiving the signal elements, a plurality of condensers adapted to be selectively charged from said input relay in response to the marking and spacing elements of each signal, said electrical input relay comprising grid controlled thermionic tubes controlling the charging of said condensers and cooperating therewith to effect integrating scanning of the signal elements, distributor means receiving the integrated signal elements from said condensers, and output relay means receiving the signal elements from said distributor means.

7. In telegraph receiving apparatus for receiving code combination signals each composed of marking and spacing elements so coded as to be in a constant numerical ratio to each other, the combination of an electrical input relay receiving the signal elements, a plurality of condensers adapted to be selectively charged from said electrical input relay in response to the marking and spacing elements of each signal, said electrical input relay comprising rectifying means and a plurality of grid controlled vacuum tubes controlling the charging of said condensers and cooperating therewith to effect integrating scanning of the signal elements, and output relay means receiving the integrated signal elements from said condenser means.

8. In telegraph receiving apparatus for receiving code combination signals each composed of marking and spacing elements, the combination of rectifying means adapted to receive the input signal elements, two grid controlled vacuum tubes connected with said rectifier means for receiving the intermittent current output of said rectifier means, a charging circuit connected with the anodes of said two vacuum tubes and arranged whereby a charging potential is caused to flow in one direction in said charging circuit upon the reception of a marking element of the signal and is caused to flow in the opposite direction in said charging circuit upon the reception of a spacing element of the signal, a plurality of condensers adapted to be connected to said charging circuit so as to be alternately charged with positive and negative polarity by the oppositely flowing charging potentials in said charging circuit, charging contacts controlling the connection of said charging circuit with said condensers, polarized relays adapted to be energized in either direction by the positive or negative polarity charges of said condensers, discharging contacts controlling the connection between said condensers and said polarized relays, said charging and discharging contacts being operated in alternating sequence whereby when one of said condensers is being charged another of said condensers is discharging, and distributor means connected with said polarized relays.

9. In receiving apparatus for a telegraph system, the combination of an input transformer adapted to receive the signals, a full-wave rectifier connected with the secondary of said transformer, two grid controlled electron tubes, means for impressing the intermittent current output of said rectifier upon the control grid of one of said tubes, means for causing plate current changes in said latter tube to vary the control grid potential of the other tube, receiving relay means, distributor means for distributing signal elements to said receiving relay means, and signal integrating means operatively connected between said electron tubes and said distributor means for providing a signal of a value sufficient to effect operation of associated receiving equipment with receipt of a signal of a value which is less than said operating value.

10. In receiving apparatus for a telegraph system, the combination of an input transformer adapted to receive the signals, a full-wave rectifier connected with the secondary of said transformer, two grid controlled electron tubes, means for impressing the intermittent current output of said rectifier upon the control grid of one of said tubes, means for causing plate current changes in said latter tube to vary the control grid potential of the other tube, receiving relay means, distributor means for distributing signal elements to said receiving relay means, and signal integrating means including an inductive member operatively connected between said electron tubes and said distributor means for providing a signal of a value sufficient to effect operation of associated receiving equipment with receipt of a signal of a value which is less than said operating value.

11. A method of regenerating signal intelligence comprising the steps of producing two reference potentials, one corresponding to mark elements of said signal intelligence and the other corresponding to space elements of said signal intelligence, charging a first storage device by said potentials at a constant current rate throughout substantially an entire unit interval, simultaneously discharging a second storage device through an impedance, discharging said first discharge device during the next unit interval, simultaneously charging said second storage device by said potentials at a constant current rate throughout substantially the entire unit interval repeating the charge-discharge cycle at unit interval frequency and utilizing the potentials produced by said discharges to regenerate said signal intelligence.

HENDRIK C. A. VAN DUUREN.

REFERENCES CITED

The following references are of record in the file of this patent:

UNITED STATES PATENTS

| Number | Name | Date |
|---|---|---|
| 1,332,976 | Dowd | Mar. 9, 1920 |
| 2,006,582 | Callahan | July 2, 1935 |
| 2,373,970 | Mathes | Apr. 17, 1945 |
| 2,470,677 | Anderson | May 17, 1949 |